No. 777,486. Patented December 13, 1904.

UNITED STATES PATENT OFFICE.

HARRY PAULING, OF BRANDAU, AUSTRIA-HUNGARY.

PROCESS OF MANUFACTURING NITRIC ACID.

SPECIFICATION forming part of Letters Patent No. 777,486, dated December 13, 1904.

Application filed August 12, 1902. Serial No. 119,392. (No specimens.)

*To all whom it may concern:*

Be it known that I, HARRY PAULING, director of mines, a citizen of the Kingdom of Saxony, and a resident of Brandau, Bohemia, Austria-Hungary, (whose post-office address is house No. 200,) have invented certain new and useful Improvements in Processes of Manufacturing Nitric Acid from Atmospheric Air by Electricity, of which the following is a specification.

My invention relates to a process for manufacturing nitric acid from atmospheric air by means of electricity, and has for its object to render the process more expeditious and considerably cheaper.

A further object of my invention is to obtain an oxidation of the nitrogen more rapid and exhaustive as this is effected by the processes hitherto known.

A further object is to avoid the enormous loss of heat due to the disadvantageous secondary reactions connected with similar processes.

With these ends in view my invention consists in the novel combination and adaptation of procedures, as more fully described hereinafter and specifically set forth in the appended claims.

My said invention consists in first adding energy to a certain quantity of atmospheric air by way of either ozonizing the air by dark electric discharges or heating said air to a temperature where nitric oxid is decomposed into nitric dioxid and nitrogen. This takes place at a temperature of 1,000° to 1,200° centigrade.

My invention consists, further, in treating the air, to which energy has been previously added, with electric-spark discharges. The amount of water necessary to convert the nitrous compounds formed into nitric acid may then be added by introducing steam and fresh air or hydrogen or gas mixtures containing hydrogen, such as water-gas, into this air after the electric-spark discharges have been interrupted.

As is known, when a current or body of air at normal temperature is subjected to the effect of a discharge of electric sparks nitric oxid, nitric dioxid, and ozone are produced. These three gases are endothermic compounds—that is to say, require the addition of heat or energy for their formation. If the heats of formation of these compounds are compared with each other, it will be seen that the nitric oxid and the ozone require considerably more energy for their formation than the nitric dioxid. The molecular weight of nitric dioxid is forty-six grams, and this gas requires two calories per unit volume, whereas with a molecular weight of thirty nitric oxid requires twenty-two calories—that is to say, the elevenfold amount of energy—and ozone thirty-two calories, or the sixteenfold amount of energy.

In the production of nitric acid by means of electricity, therefore, the formation of nitric oxid and ozone causes a most important loss of heat, which is quite out of proportion to the result obtained and to the energy expended. Nitric oxid and ozone certainly do themselves likewise produce nitric dioxid, but only by passing through the wasteful stages of their own intermediate formation. The heat set free by the reaction is lost for the purposes of the process. Since, however, ozone splits up into its oxygen atoms at 350° centigrade—that is to say, can neither exist nor be formed at a temperature above 350° centigrade—and since nitric acid splits up into nitric dioxid and nitrogen at approximately 1,000° ($2NO = NO_2 + N$), neither nitric oxid nor ozone can be formed if the spark discharge takes place in air heated to a temperature above the decomposing temperature of nitric oxid.

The current is supplied by an induction-coil connected with a dynamo. The ozonizing of the air is effected by dark electric discharges, the air, for instance, being conducted through a receptacle inclosing a condenser, which consists of two parallel glass plates covered with metal on the sides forming the adjacent faces or those facing each other and connected with the induction-coil. The dark electric discharges between the two metal plates cause the oxygen of the air to be converted into ozone. The air is then conducted into another receptacle and there subjected to electric-spark discharges.

In executing the new process the decomposed air may further be used for heating the newly-introduced air by means of a reverse-current apparatus with or without heat-regenerators in such a manner that not only none of the heat generated by the energy of the sparks will be lost, but that it will assist in performing the process the more the longer said process is continued. Thereby a further economy in the manufacture is obtained.

Having thus described my invention, I claim as new and desire to secure by Letters Patent—

1. The process of manufacturing nitric acid from atmospheric air, which consists in maintaining the air at a temperature at which ozone and nitric oxid are decomposed, and subjecting the same to a spark discharge thereby transforming the nitrogen and oxygen of said air into nitrogen dioxid and then converting the same into nitric acid.

2. The process of manufacturing nitric acid from atmospheric air by electricity, which consists in maintaining the air at a temperature approximately 1,000° centigrade and subjecting the same to a spark discharge thereby transforming the nitrogen and oxygen of said air into nitrogen dioxid and then converting the same into nitric acid.

In testimony whereof I affix my signature in presence of two witnesses.

HARRY PAULING.

Witnesses:
  WOLDEMAR HAUPT,
  HENRY HASPER.